June 10, 1941.  H. W. SIMPSON  2,245,450
TRACTOR-MOWER STRUCTURE
Original Filed Oct. 30, 1939  3 Sheets-Sheet 1
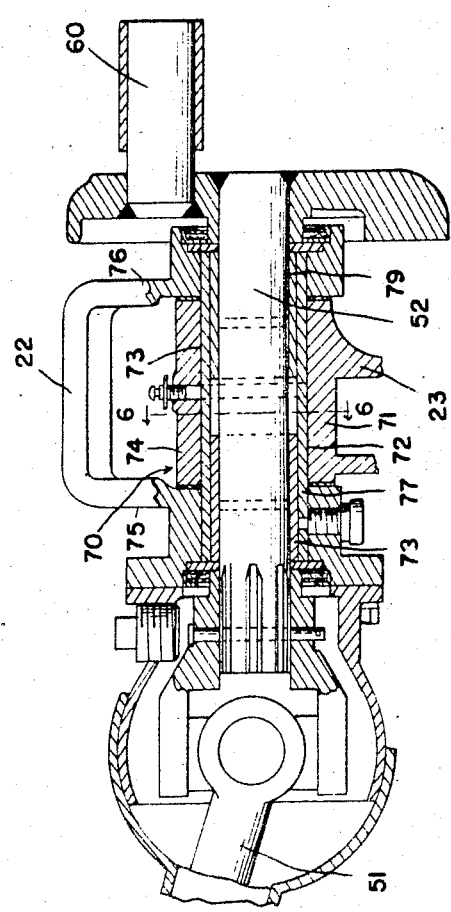
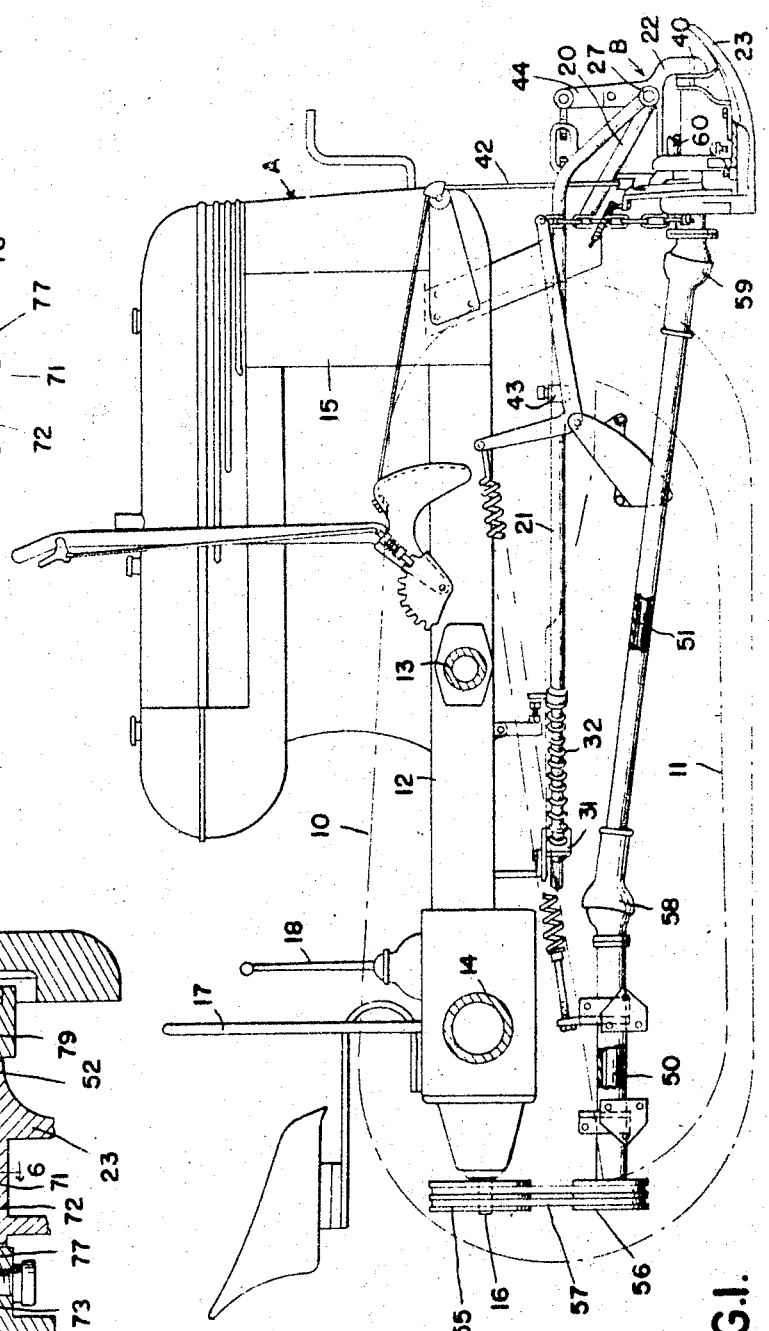
INVENTOR.
HOWARD W. SIMPSON
BY
ATTORNEYS

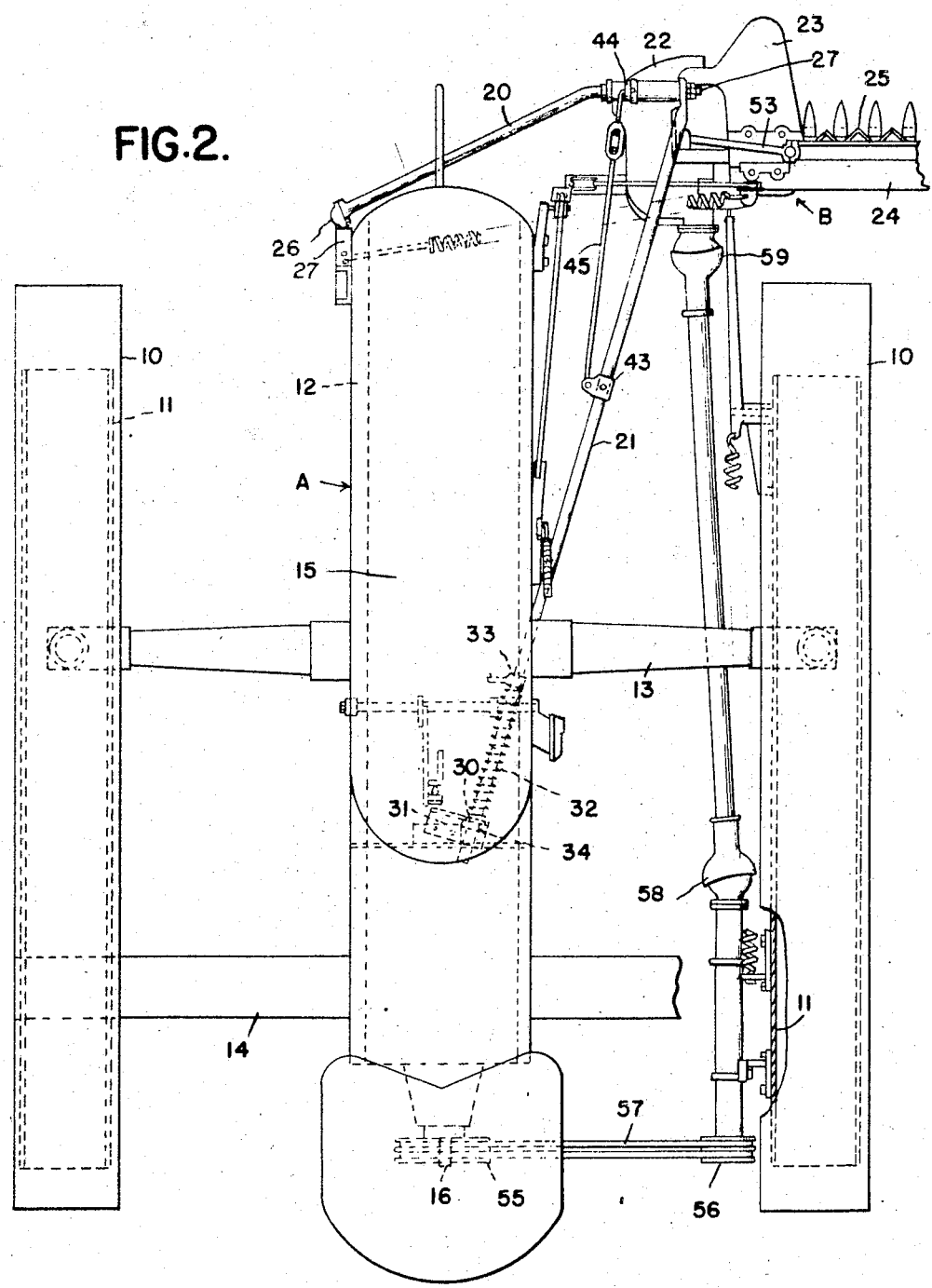

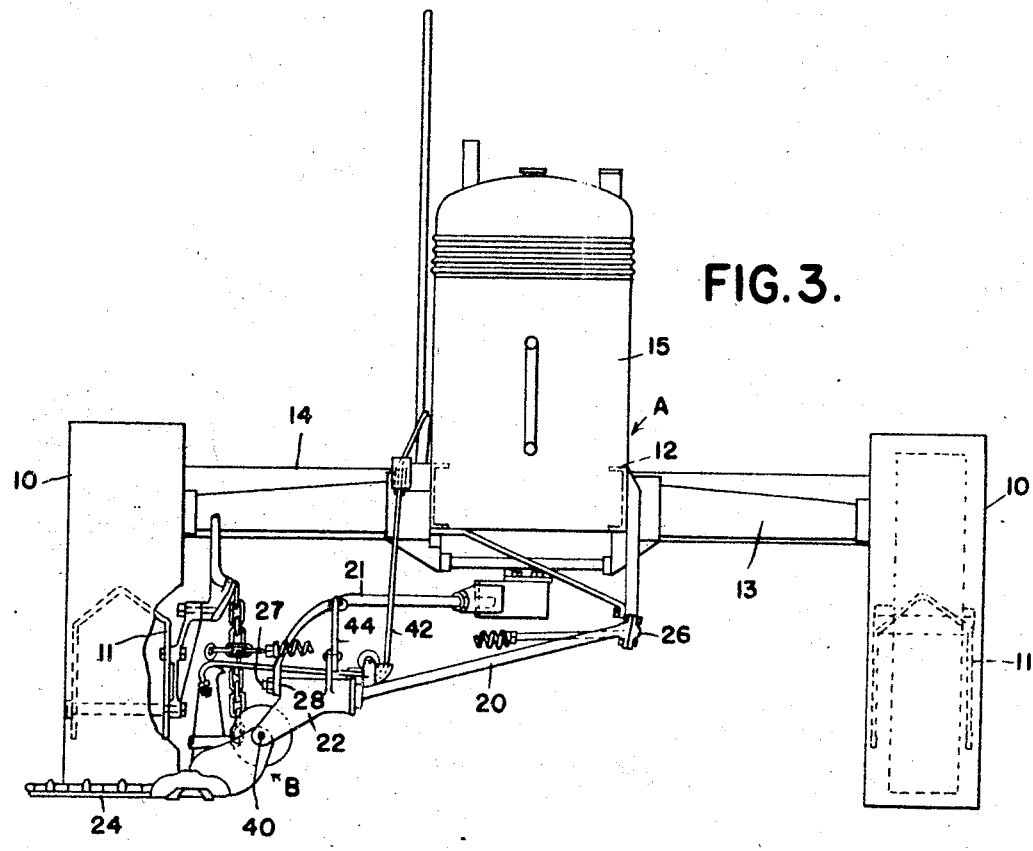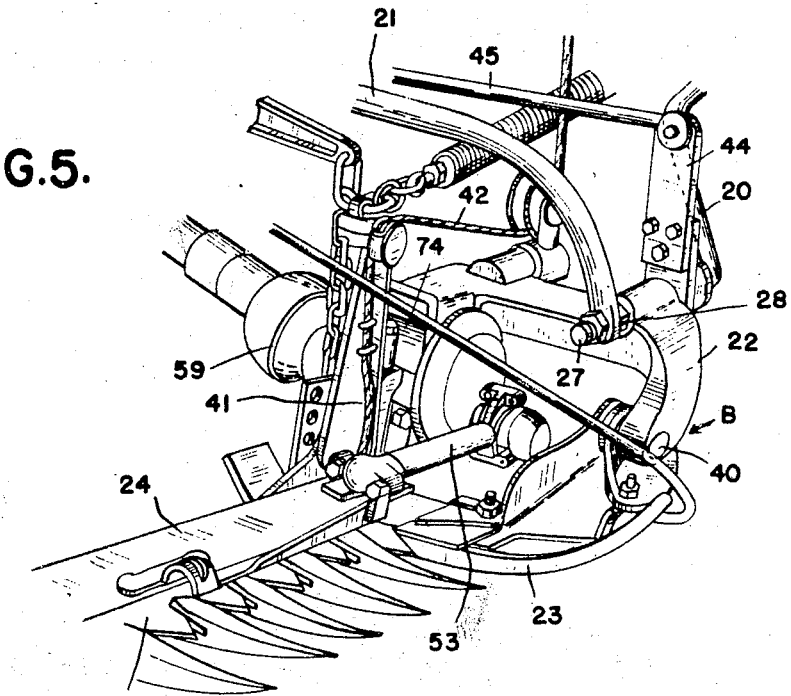

Patented June 10, 1941

2,245,450

UNITED STATES PATENT OFFICE 2,245,450

TRACTOR-MOWER STRUCTURE

Howard W. Simpson, Dearborn, Mich., assignor to Detroit Harvester Company, Detroit, Mich., a corporation of Michigan Original application October 30, 1939, Serial No. 302,043. Divided and this application March 4, 1940, Serial No. 322,250

16 Claims. (Cl. 56—26)

This invention relates generally to tractor-mower structures and constitutes a division of my application filed October 30, 1939, bearing Serial No. 302,043.

One of the essential objects of the invention is to provide an improved mounting for the cutter bar of the mower assembly.

Another object is to provide a mounting that greatly facilitates attachment of the cutter bar to and removal from its supporting means.

Another object is to provide a mounting that cooperates with a portion of its supporting means to form a bearing housing for a part of the driving means for the sickle carried by the cutter bar.

Other objects, advantages and novel details of construction of this invention will be made more apparent as this description proceeds, especially when considered in connection with the accompanying drawings, wherein:

Figure 1 is a side elevation partly in section showing the tractor-mower assembly;

Figure 2 is a top plan view with parts broken away of the same tractor-mower;

Figure 3 is a front elevation of the tractor-mower;

Figure 4 is a vertical section through the hinge bearing and crank shaft assembly;

Figure 5 is a perspective view of the mower structure;

Figure 6 is a sectional view taken on the line 6—6 of Figure 4.

Referring to the drawings, A is the tractor, and B is the mower assembly of a tractor-mower structure embodying my invention. As shown, the tractor A is of the crawler type and has laterally spaced, endless tracks 10 mounted on suitable track frames 11. The main frame 12 of the tractor is between the track frames 11 and is supported therefrom by a front axle housing 13 and a rear axle housing 14. Carried by the main frame 12 at its forward end is an internal combustion engine or motor 15 that is operatively connected to the endless tracks 10 to drive the tractor forwardly or rearwardly, and that is provided at the rear end of the main frame with a power take-off shaft 16.

As usual, the tractor A has a suitable steering brake control lever 17 and gear shift lever 18.

The mower assembly B is supported by two rods or bars 20 and 21, respectively, and a hinge bracket 22 for vertical swinging movement relative to the tractor, and comprises an inner shoe 23, cutter bar 24 and sickle 25. Preferably the bars 20 and 21 are disposed at substantially right angles to each other and are pivotally connected to the bracket 22. In the present instance the bar 20 extends across the front of the main frame, while the bar 21 extends longitudinally of said frame. To provide an efficient structure, one end of the bar 20 has a universal mounting 26, while the other end portion 27 thereof extends through the bracket 22. The bar 21 has an eye 28 receiving the end portion 27 of the transverse bar 20 and extends freely through an enlarged opening 30 in a supporting bracket 31 fixed to the main frame 12 substantially midway between the front and rear axle housings 13 and 14. Thus, both bars 20 and 21 and the bracket 22 as a unit may swing upwardly and may swing rearwardly about the universal mounting 26 as the pivot point.

Normally the mower assembly B is held in forward cutting position by a coiled spring 32 sleeved on the bar 21 between a collar 33 on said bar and the bracket 31. A second collar 34 on the bar 21 in rear of the bracket 31 limits the forward movement of the bar 21. Upon abnormal strain being exerted, such as would be caused by the mower assembly encountering an obstruction or obstacle, the mower assembly B will swing rearwardly about pivot point 26. In doing so, the bar 21 will slide rearwardly against the tension of the spring 32.

The inner shoe 23 is rigidly secured to the cutter bar 24 at its inner end and is pivotally connected at 40 to the bracket 22. Any suitable means such as the lever 41 and cable 42 may be used to swing the mower bar 24 and shoe 23 upwardly about the pivot 40. Likewise, any suitable means such as the adjustable collar 43 on the rod 21, lever 44 and intermediate rod 45 may be used to tilt the mower bar 24 and shoe 23 about the axis of the end portion 27 of the bar 21.

For driving the sickle 25 I have provided a countershaft 50, propeller shaft 51, crank shaft 52 and pitman 53. Non-rotatively mounted on the power take-off shaft 16 and countershaft 50 are pulleys 55 and 56 over which a drive belt 57 is trained. 58 and 59, respectively, are universal connections between the countershaft 50 and propeller shaft 51 and between the latter and the crank shaft 52. As usual, the pitman 53 is terminally connected to the crank 60 of the shaft 52 and to the sickle 25.

In the present instance there is a split hinge bearing or sleeve 70 between the bracket 22 and the inner shoe 23 of the mower assembly. As shown, the upper portion 71 of the inner shoe has a half round recess 72 which cooperates with a half round recess 73 in a removable cap 74 to provide between the spaced portions 75 and 76, respectively, of the casting, a tubular housing for a sleeve 77 on the crank shaft 52. Located in this sleeve 77 at opposite ends thereof are suitable bearings 78 and 79, respectively. By referring to Figure 4 it will be noted that the sleeve 77 and bearings 78 and 79 extend within the spaced portions 75 and 76 of the bracket 22. Thus, the half round portions 72 and 73 cooperate with the spaced portions 75 and 76 of the casting to provide a housing for the bearings for the shaft 52.

From the foregoing it will be apparent that the mower assembly B may be easily and quickly removed from the supporting bracket 22 by simply detaching the cap 74 from the upper portion 71 of the inner shoe and disconnecting the pitman 53 from the crank 60 and removing the pivot 40 from the bracket 22. As a result, the structure set forth provides ready association and disassociation of the mower assembly B with the tractor A.

What I claim as my invention is:

1. In a mowing machine, a mower shoe, a supporting hinge bracket for the shoe having laterally spaced portions, a crank shaft journaled in said laterally spaced portions, a sleeve on the shaft having opposite ends thereof extending within the laterally spaced portions of the bracket, bearings for the shaft within the sleeve at opposite ends thereof, and a detachable pivotal connection between the shoe and bracket including a sectional bearing on the sleeve between the laterally spaced portions of the bracket, one section of the bearing being rigid with the shoe.

2. In a mowing machine, a mower shoe, a supporting hinge bracket for the shoe having laterally spaced portions, a crank shaft journaled in said laterally spaced portions, a sleeve on the shaft having opposite ends thereof extending within the laterally spaced portions of the bracket, bearings for the shaft within the sleeve at opposite ends thereof, and a detachable pivotal connection between the shoe and bracket cooperating with the laterally spaced portions of the bracket to form a housing for the sleeve and bearings and including a sectional bearing on the sleeve between the laterally spaced portions of the bracket, one section of the bearing being rigid with the shoe.

3. In a mowing machine, a tractor, a mower shoe adjacent the tractor, a cutter bar carried by the shoe, means for driving the cutter bar from the tractor including a crank shaft, a sleeve for the crank shaft, and a housing for said sleeve including a bracket having laterally spaced portions encircling the sleeve and supported from the tractor, and a sectional bearing on the sleeve between said laterally spaced portions, one section of said bearing being connected to said shoe.

4. In a mowing machine, a mower shoe, a cutter bar carried by said shoe, a crank shaft for driving the cutter bar, a sleeve for the crank shaft, and a housing for said sleeve including a supporting bracket having laterally spaced portions encircling the sleeve, and a sectional bearing on the sleeve between said laterally spaced portions, one section of said bearing being an extension of said shoe.

5. In a mowing machine, a mower shoe, a cutter bar carried by said shoe, a crank shaft for driving the cutter bar, a supporting bracket, bearings for the crank shaft in said bracket, a sleeve for said bearings in said bracket, and a sectional bearing on said sleeve, one section being an extension of said shoe.

6. In a mowing machine, a cutter bar, a crank shaft for driving the cutter bar, a supporting bracket, a bearing for the crank shaft in said bracket, a sleeve for said bearing in said bracket, and a mower shoe supporting said cutter bar and having cooperating portions forming a sectional bearing on said sleeve.

7. In a mowing machine, a supporting bracket having laterally spaced portions, a crank shaft journaled in the laterally spaced portions of said bracket, a cutter bar operatively connected to said crank shaft so as to be driven thereby, and a mower shoe supporting said cutter bar and having cooperating portions forming a sectional bearing sleeve on said crank shaft between the laterally spaced portions of said bracket.

8. In a mowing machine, a cutter bar, a crank shaft operatively connected to the cutter bar, bearings for said crank shaft, and a housing for the bearings including a sleeve thereon, a supporting bracket having laterally spaced portions encircling the sleeve, and a mower shoe supporting the cutter bar and having detachable portions forming a sectional bearing sleeve on the sleeve aforesaid between the laterally spaced portions of said bracket.

9. In a mowing machine, a cutter bar, a crank shaft operatively connected to the cutter bar, bearings for said crank shaft, and a housing for the bearings including a supporting bracket having laterally spaced portions encirling the bearings, and a mower shoe supporting the cutter bar and having detachable portions forming a sectional sleeve on the bearings between the laterally spaced portions of said bracket.

10. In a mowing machine, a mower shoe, a supporting hinge bracket for the shoe having laterally spaced portions, a crank shaft journaled in said laterally spaced portions, bearings for the shaft within the laterally spaced portions of the bracket, and a detachable pivotal connection between the shoe and bracket including a sectional bearing on the shaft between the laterally spaced portions of the bracket, one section of the bearing being an extension of the shoe.

11. In a mowing machine, a tractor, a mower assembly adjacent the tractor and including a cutter bar and a supporting shoe therefor, means for driving the cutter bar from the tractor including a crank shaft, and a housing for the crank shaft including a bracket and a cooperating sleeve, the bracket being supported from the tractor and having laterally spaced portions encircling the shaft, and the sleeve encircling the shaft between the laterally spaced portions and having two sections, one section of the sleeve being a part of the shoe.

12. In a mowing machine, a mower shoe, a supporting bracket for the shoe having laterally spaced portions, a drive shaft journaled in said laterally spaced portions, a sleeve on the shaft extending between the laterally spaced portions of the bracket, and a detachable pivotal connection between the shoe and bracket including a sectional bearing on the sleeve between the laterally spaced portions of the bracket, one section of the bearing being rigid with the shoe.

13. In a mowing machine, a mower shoe, a supporting bracket for the shoe having laterally spaced portions, a drive shaft journaled in said laterally spaced portions, a sleeve on the shaft extending between the laterally spaced portions of the bracket, and a detachable pivotal connection between the shoe and bracket cooperating with the laterally spaced portions of the bracket to form a housing for the sleeve and shaft and including a sectional bearing on the sleeve between the laterally spaced portions of the bracket, one section of the bearing being a part of the shoe.

14. In a mowing machine, a mower shoe, a supporting bracket for the shoe having laterally spaced portions, a drive shaft journaled in said laterally spaced portions, and a detachable pivotal connection between the shoe and bracket cooperating with the laterally spaced portions of the bracket to form a housing for the shaft and including a sectional bearing on the shaft extending between the laterally spaced portions of the bracket, one section of the bearing being a part of the shoe.

15. In a mowing machine, a mower shoe, a supporting bracket for the shoe having laterally spaced portions, a drive shaft journaled in said laterally spaced portions, and a sleeve on the shaft between the laterally spaced portions and having two sections cooperating with the bracket to form a housing for the shaft, one section of said sleeve being rigid with the shoe.

16. In a mowing machine, a mower shoe, a supporting bracket for the shoe having laterally spaced portions, a drive shaft journaled in said laterally spaced portions, and a detachable pivotal connection between the shoe and bracket including a sectional bearing on the shaft between the laterally spaced portions of the bracket, one section of said bearing being rigid with the shoe.

HOWARD W. SIMPSON.